United States Patent
Lohr et al.

(10) Patent No.: US 8,943,670 B2
(45) Date of Patent: Feb. 3, 2015

(54) COMPOSITE ENGINE PART AND FASTENER ASSEMBLY AND METHOD OF SECURING A COMPOSITE PART TO AN ENGINE

(75) Inventors: John Carl Lohr, Beverly Hills, MI (US); Christopher William Newman, Farmington Hills, MI (US); Timothy J. Knott, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 112 days.

(21) Appl. No.: 13/588,244

(22) Filed: Aug. 17, 2012

(65) Prior Publication Data
US 2014/0047700 A1 Feb. 20, 2014

(51) Int. Cl.
*B23P 11/00* (2006.01)
*F16B 39/282* (2006.01)

(52) U.S. Cl.
USPC .................. 29/525.02; 411/145; 411/166

(58) Field of Classification Search
USPC .......... 29/525.02, 525.05; 411/102, 144–146, 411/166, 176, 134, 145, 149, 161, 162, 165, 411/185, 186, 240, 332, 451.3, 959
See application file for complete search history.

(56) References Cited

U.S. PATENT DOCUMENTS

| | | | | |
|---|---|---|---|---|
| 1,427,807 A * | 9/1922 | Halbleib | ...... | 403/230 |
| 2,128,757 A * | 8/1938 | Olson | ...... | 411/187 |
| 3,275,055 A * | 9/1966 | Gutshall | ...... | 411/134 |
| 3,825,051 A | 7/1974 | Sigmund | | |
| 4,034,788 A * | 7/1977 | Melone | ...... | 411/134 |
| 4,294,300 A | 10/1981 | Bouwman | | |
| 4,657,459 A | 4/1987 | Landt | | |
| 4,808,050 A * | 2/1989 | Landt | ...... | 411/188 |
| 4,812,095 A | 3/1989 | Piacenti et al. | | |
| 4,842,463 A * | 6/1989 | Landt | ...... | 411/188 |
| 5,183,359 A * | 2/1993 | Barth | ...... | 411/188 |
| 6,135,689 A * | 10/2000 | Matsunami | ...... | 411/311 |
| 7,014,406 B2 * | 3/2006 | Robertson | ...... | 411/161 |
| 7,128,511 B2 * | 10/2006 | Hewgill | ...... | 411/149 |
| 7,597,516 B2 | 10/2009 | Bucciferro et al. | | |
| 2002/0039522 A1* | 4/2002 | Hartmann et al. | ...... | 411/161 |
| 2007/0243040 A1* | 10/2007 | Chen | ...... | 411/161 |

* cited by examiner

*Primary Examiner* — Alexander P Taousakis
(74) *Attorney, Agent, or Firm* — James Dottavio; Brooks Kushman P.C.

(57) ABSTRACT

A method of securing a composite plastic part to an engine with a bolt or a bolt and washer. The bolt has a head including teeth that are adapted to engage either the part or the washer. The bolt is tightened to cause the teeth to compress the surface of the part to resist rotation that may become loosened as a result of vibration of the engine. The part may be an intake manifold, a cam cover or an oil pan. Locking features, such as teeth, may be provided on the clamping surface of the bolt and on both surfaces of the washer. Alternatively, a knurled or serrated surface may be provided instead of the teeth.

5 Claims, 2 Drawing Sheets

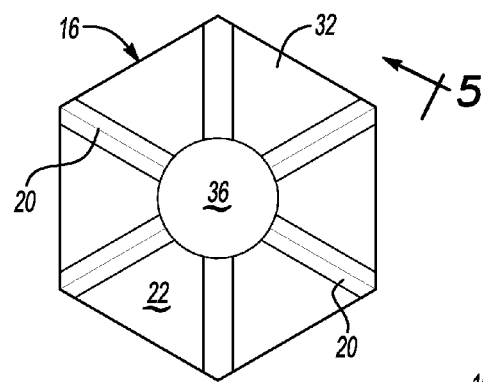
_Fig-4_
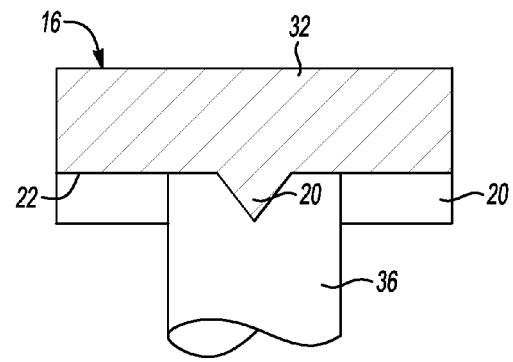
_Fig-5_
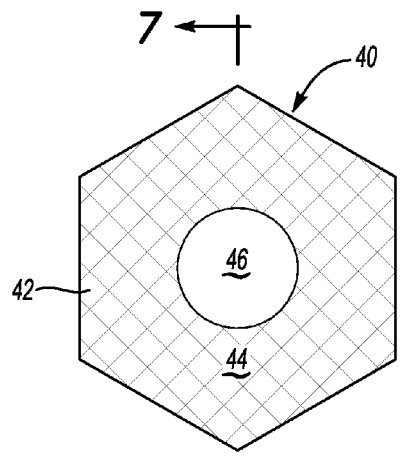
_Fig-6_
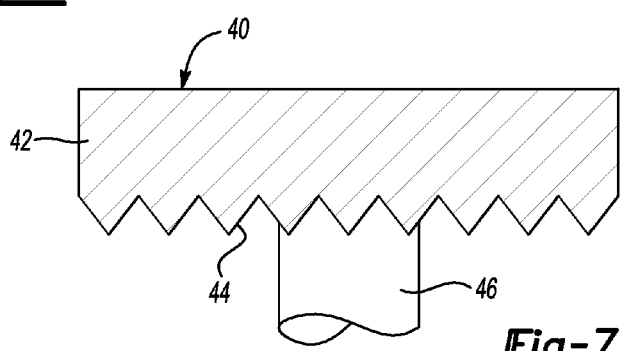
_Fig-7_

COMPOSITE ENGINE PART AND FASTENER ASSEMBLY AND METHOD OF SECURING A COMPOSITE PART TO AN ENGINE

TECHNICAL FIELD

This disclosure relates to a method and apparatus for attaching parts made of composite material with a fastener to an engine.

BACKGROUND

Composite parts are fabricated from reinforced plastic materials such as glass filled nylon or filled polypropylene. Composite parts provide a light weight alternative to steel or cast iron engine parts for vehicles. One problem with composite parts is that they may tend to creep over time especially when in an environment that is subject to heat and to a lesser extent vibration. A bolt for a composite part may eventually back out if the composite material in an area around the bolt creeps outwardly from under the bolt used to secure the part to a supporting member that is subject to vibration, such as an engine, Referring to FIG. 1, a prior art composite part P is illustrated (such as an intake manifold, oil pan or cam cover) that is provided with a torque limiter sleeve S that is received in a hole H defined by the composite part P. The torque limiter sleeve S provides a rigid non-compressible insert that a bolt B may be tightened against with a torque limited driver without compressing the composite part P. The bolt B may be provided with a washer W. A torque limiter sleeve S adds both cost and weight to an assembly.

This disclosure is directed to solving the above problems and other problems as summarized below.

SUMMARY

According to one aspect of this disclosure, a method is provided for securing a composite plastic part to an engine with a bolt. The method comprises providing a hole in the part, providing a locking element on a surface of the bolt that engages the part, inserting the bolt through the hole, and rotating the bolt in a first rotational direction to cause the locking element to compress the surface of the part sufficiently to resist rotation in a second rotational direction caused by engine vibration.

According to other aspects of the method, the method may further comprise forming a hole in the composite part to receive the bolt. The bolt is received in a tapped hole in the engine. The bolt may directly engage the composite part without inserting a torque limiter sleeve in the composite part around the bolt. The locking element may be a set of teeth.

According to another aspect of the disclosure, an alternative method is provided for securing a composite plastic part to an engine with a bolt and a washer. The alternative method comprises providing a hole in the part and providing a first locking feature on a first surface of the washer that engages the part. A second locking feature is provided on a second surface of the washer, and a third locking feature provided on a washer engaging surface of the bolt. According to the alternative method the bolt is inserted into the hole through the washer. The bolt is rotated in a first rotational direction to cause the third locking feature to engage the second locking feature to rotate the washer. The washer is rotated by the bolt to cause the first locking feature to compress the surface of the part sufficiently to resist rotation in a second rotational direction caused by engine vibration.

According to other aspects of the alternative method, the first, second and third locking features correspond to first, second and third sets of teeth. The first set of teeth may be smaller than the second and third sets of teeth. The alternative method may further comprise selecting the washer based upon a coefficient of friction value of the composite material. The bolt and the washer are rotated in the first rotational direction to drive the first set of teeth into engagement with the part with the third set of teeth engaging the second set of teeth. The bolt may directly engage the composite part without inserting a torque limiter sleeve in the composite part around the bolt.

According to another aspect of the disclosure, an assembly is disclosed that may be attached to an engine. The assembly may comprise a composite plastic part that defines a hole that is not supported by a torque limiter sleeve. A threaded fastener is inserted into a tapped hole in the engine. The threaded fastener has a gripping surface formed on a side of the fastener that engages the part when the fastener is fully received in the tapped hole to prevent the fastener from backing out of the hole as a result of vibration.

According to other aspects of the disclosure as it relates to the assembly, the gripping surface may include a first set of teeth that deform the composite plastic part. Alternatively, the gripping surface may be a knurled surface or a serrated surface.

The composite plastic part may be a glass filled nylon member that is selected from the group consisting of an intake manifold, a cam cover, an oil pan, or the like According to another aspect of this disclosure, an alternative assembly is disclosed that is designed to be attached to a supporting member that is subject to vibration during operation of the supporting member. The assembly comprises a composite plastic part that defines a hole, a bolt that has a bolt head including a first locking feature and a threaded shaft that may be received in a tapped hole in the engine. A washer having a bolt head engaging surface includes a second locking feature and a part engaging surface with a third locking feature. The bolt is driven into the tapped hole with the first locking feature rotating the washer by engaging the second locking feature with the third locking feature engaging the part to prevent the bolt from backing out of the hole.

According to other aspects of the alternative assembly, the first, second and third locking features correspond to first, second and third sets of teeth. The third set of teeth may be smaller than the first and second sets of teeth. The washer may be selected based upon a coefficient of friction value of the composite material. The bolt and the washer may be rotated in the first rotational direction causing the third set of teeth to be driven into engagement with the part by the first set of teeth engaging the second set of teeth. The bolt may directly engage the composite part without providing a torque limiter sleeve in the composite part around the bolt.

These and other aspects of the disclosure will be better understood in view of the attached drawings and the following detailed description of the illustrated embodiments of the disclosure.

BRIEF DESCRIPTION OF THE DRAWINGS

FIG. 4 is a bottom plan view of a bolt having teeth that are adapted to engage the composite part;

FIG. 5 is a cross-sectional view taken along the line 5-5 in FIG. 4;

FIG. 6 is a bottom plan view of an alternative embodiment of a bolt having a serrated or knurled surface; and FIG. 7 is a cross-sectional view taken along the line 7-7 in FIG. 6.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
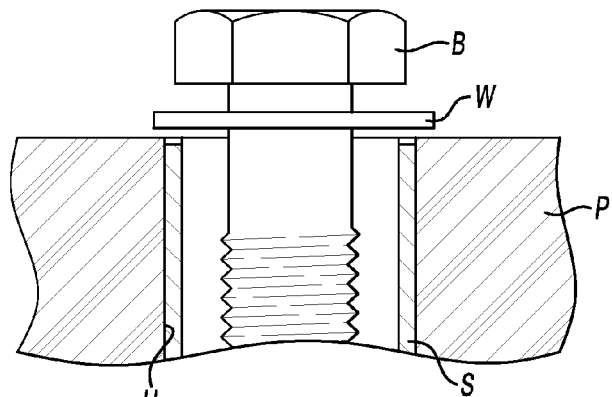
FIG. 1 is a diagrammatic cross-sectional view of a prior art composite part that defines a hole lined by a torque limiter sleeve.
Figure 2:
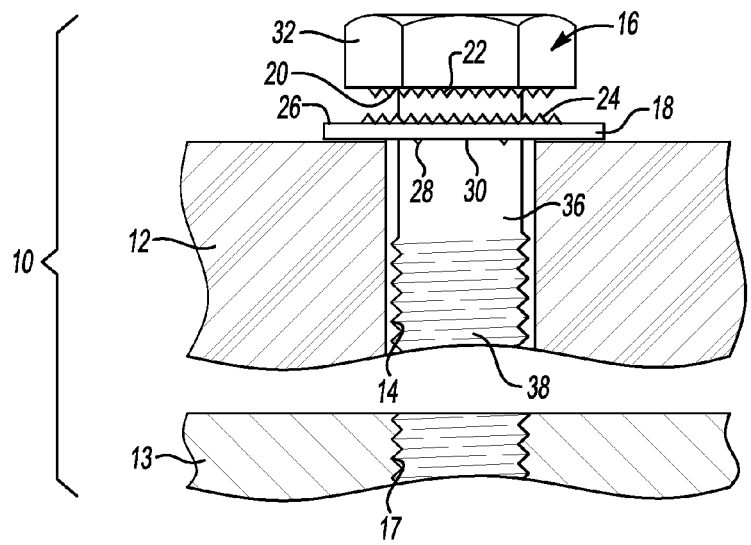
FIG. 2 is a diagrammatic cross-sectional view of a bolt and washer being inserted into a composite part.

Referring to FIG. 2, an assembly 10 is shown for attaching a composite plastic part 12 to an engine 13. The composite plastic part 12 defines a hole 14 in which a fastener 16 is received. The fastener 16, as shown, is a bolt that is threaded into a tapped hole 17. The bolt is inserted through a washer 18.

A set of teeth 20 are provided on the clamping surface 22 of the fastener 16. Another set of teeth 24 are provided on the surface 24 of the washer 18 that faces the fastener 16. Another set of teeth 28 are provided on the surface 30 of the washer 18 that engages the composite plastic part 12.

The fastener 16 includes a head 32 on a shaft 36. The shaft 36 includes threads 38 that are adapted to be threaded into the tapped hole 17 in the engine 13.

Figure 3:
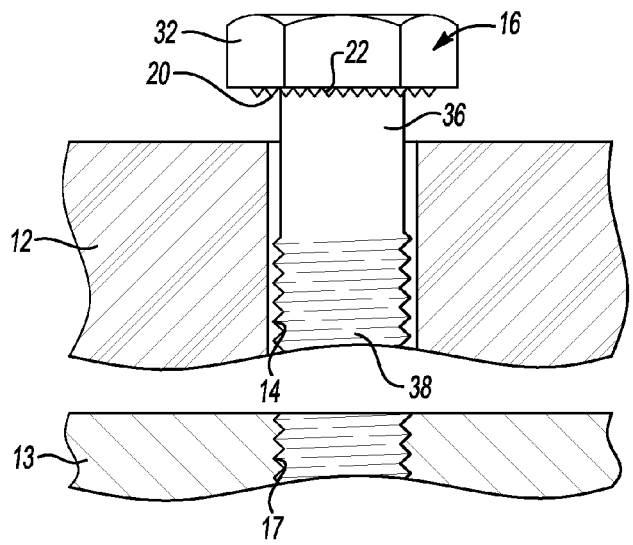
FIG. 3 is a diagrammatic cross-sectional view of a bolt being inserted into a composite part.

Referring to FIG. 3, an alternative embodiment is shown in which the bolt 16 is inserted into the composite plastic part 12 directly without an intervening washer 18, as shown in FIG. 2. The bolt 16 has a head 32 on a shaft 36 that includes threads 38. The bolt is tightened into the engine 13 with the threads 38 being received in the tapped hole 17. The teeth 20 on the clamping surface of the bolt 16 engage the composite plastic part 12 when the bolt 16 is tightened. The teeth compress the composite plastic part 12 to resist the tendency of the bolt 16 to back out of the tapped hole 14 as a result of engine vibration 13.

Referring to FIGS. 4 and 5, a bolt 16 is shown with a head 32 that includes six teeth on the clamping surface 22 of the bolt head 32.

Referring to FIGS. 6 and 7, an alternative embodiment of a bolt 14 is shown. The bolt 40 includes a head 42 that has a knurled surface 44, or serrated surface, that is adapted to engage the composite plastic part 12, as shown in FIG. 3. The knurled surface 44 is used in place of the teeth 20 to resist the bolt backing out of the composite plastic part 12.

While FIGS. 4-7 illustrate different embodiments of the teeth on the bolt head 32, similar arrangements may be provided on the washer 18. However, the shafts 36 and 46, shown in FIGS. 4-7, in the case of a washer comprise a hole through the washer in which the bolt 16 may be inserted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of securing a composite plastic part to an engine with a bolt and a washer comprising:

providing the composite plastic part that defines a hole;

providing a first locking feature on a first surface of the washer that engages the part, the first locking feature including a first set of teeth, each of the teeth extending radially outward from an inner hole defined in the washer to a periphery of the washer, each of the teeth being a triangular prism having a base attached to the first surface and an edge opposite the base for engaging the part;

providing a second locking feature on a second surface of the washer;

providing a third locking feature on a washer engaging surface of the bolt; and inserting the bolt through the hole and the washer and rotating the bolt in a first rotational direction to cause the third locking feature to engage the second locking feature to rotate the washer, wherein the washer is rotated by the bolt to cause the first locking feature to compress the surface of the part sufficiently to resist rotation in a second rotational direction caused by vibration of the engine.

2. The method of claim 1 wherein the second locking feature is a second set of teeth and the third locking feature is a third set of teeth.

3. The method of claim 2 wherein the first set of teeth is smaller than the second and third sets of teeth.

4. The method of claim 3 further comprising:

selecting the washer based upon a coefficient of friction value of the composite plastic part; and rotating the bolt and the washer in the first rotational direction wherein the first set of teeth is driven into engagement with the part by the third set of teeth engaging the second set of teeth.

5. The method of claim 1 wherein the bolt directly engages the composite part without inserting a torque limiter sleeve in the composite part around the bolt.

* * * * *